(12) United States Patent
Mutoh et al.

(10) Patent No.: US 7,211,121 B2
(45) Date of Patent: May 1, 2007

(54) POLISHING COMPOSITION

(75) Inventors: Tatsuhito Mutoh, Bisai (JP); Hirohito Kitano, Aichi-ken (JP)

(73) Assignee: Fujimi Incorporated, Aichi (JP)

( * ) Notice: Subject to any disclaimer, the term of this patent is extended or adjusted under 35 U.S.C. 154(b) by 0 days.

(21) Appl. No.: 10/813,219

(22) Filed: Mar. 30, 2004

(65) Prior Publication Data

US 2004/0187393 A1    Sep. 30, 2004

(30) Foreign Application Priority Data

Mar. 31, 2003  (JP) .............................. 2003-097247

(51) Int. Cl.
- *C09G 1/02* (2006.01)
- *C09G 1/04* (2006.01)
- *B24B 1/00* (2006.01)

(52) U.S. Cl. .............................. 51/307; 51/309; 106/3; 106/5; 451/36

(58) Field of Classification Search .................. 51/307, 51/309; 106/3, 5; 451/36; 438/692, 693
See application file for complete search history.

(56) References Cited

U.S. PATENT DOCUMENTS

| 4,225,349 A | 9/1980 | Koshiyama et al. ............ 106/3 |
| 4,935,039 A | 6/1990 | Miyazaki et al. .............. 51/309 |
| 4,956,015 A | 9/1990 | Okajima et al. ................ 106/3 |
| 6,332,831 B1 * | 12/2001 | Shemo et al. ................. 451/41 |
| 6,342,166 B1 * | 1/2002 | Ide et al. ...................... 216/84 |
| 6,444,132 B1 * | 9/2002 | Orii et al. ..................... 216/22 |
| 6,569,215 B2 * | 5/2003 | Miyata ........................ 51/307 |

FOREIGN PATENT DOCUMENTS

| GB | 2371555 A | 11/2001 |
| JP | 07-011239 | 1/1995 |

* cited by examiner

*Primary Examiner*—Michael Marcheschi
(74) *Attorney, Agent, or Firm*—Vidas, Arrett & Steinkraus

(57) ABSTRACT

The present invention relates to a polishing composition more suitable for use in polishing synthetic resin products or metal products. The polishing composition includes a reaction product produced by a reaction between a polyalkylene oxide and a compound having a functional group having reactivity with a hydroxyl group, aluminum oxide, a polishing accelerator including at least one salt selected from the group consisting of a metal salt of an inorganic acid or organic acid and an ammonium salt of an inorganic acid or organic acid, and water.

20 Claims, No Drawings

POLISHING COMPOSITION

BACKGROUND OF THE INVENTION

The present invention relates to a polishing composition to be used for polishing synthetic resin products, metal products, and the like.

A polishing composition disclosed in Japanese Laid-Open Patent Publication No. 7-11239 contains water, aluminum oxide, and a polishing accelerator including at least two selected from aluminum nitrate, glycol, and an alumina sol. The polishing composition is used for polishing, for example, synthetic resin products such as a plastic lens or metal products such as a disk substrate.

Increase of the rate at which an object is polished by a polishing composition, that is, the polishing rate of a polishing composition for an object, is always demanded for a polishing composition. The polishing rate of a polishing composition can generally be increased by increasing the amount of an abrasive or a polishing accelerator contained in the polishing composition. However, an increase in the amount of an abrasive causes an increase in cost and an excessive increase in viscosity of the polishing composition. If the viscosity of the polishing composition is excessively high, the handling properties and antifoaming properties of the polishing composition are reduced. Moreover, a polishing composition with excessively high viscosity causes the adherence of solids in the polishing composition on the inner wall of a polishing machine or the surface during polishing, and makes it difficult to stabilize the supply of the polishing composition to the polishing machine. On the other hand, an increase in the amount of a polishing accelerator makes the operator's hands rough, and causes corrosion of the polishing machine.

In the polishing composition disclosed in the above publication, for example, an increase in the amount of aluminum oxide or glycol such as propylene glycol and ethylene glycol allows a certain increase in the polishing rate of the polishing composition. However, the increase in the polishing rate by the increase in the amount of glycol or aluminum oxide cannot fully compensate negative effects caused by the increase in the amount of glycol or aluminum oxide.

SUMMARY OF THE INVENTION

Accordingly, it is an objective of the present invention to provide a polishing composition more suitable for use in polishing synthetic resin products or metal products, and to provide a polishing method using such a polishing composition.

To achieve the foregoing and other objectives and in accordance with the purpose of the present invention, a polishing composition is provided. The polishing composition includes a reaction product produced by a reaction between a polyalkylene oxide and a compound having a functional group having reactivity with a hydroxyl group; aluminum oxide; a polishing accelerator including at least one salt selected from the group consisting of a metal salt of an inorganic acid or organic acid and an ammonium salt of an inorganic acid or organic acid; and water.

The present invention also provides a method for polishing an object. The method includes preparing the above polishing composition, and polishing the surface of the object by using the polishing composition.

Other aspects and advantages of the invention will become apparent from the following description, illustrating by way of example the principles of the invention.

DETAILED DESCRIPTION OF THE PREFERRED EMBODIMENTS

One embodiment of the present invention will now be described.

A polishing composition according to the present embodiment contains aluminum oxide, a reaction product, a polishing accelerator, and water. The polishing composition is used for polishing synthetic resin products such as a plastic lens, disk substrate, windshield, medical supply, tableware, radio part, machine part such as a small gear and bearing, button, cap, cabinet, decorative laminate, eyeglass frame, and laminate; metal products such as a disk substrate for a hard disk, semiconductor component, and machine part; and the like. The synthetic resin products may be formed of a thermoplastic acrylic resin, thermoplastic polystyrene, allyl resin, thermoplastic polycarbonate, thermoplastic polyurethane, thermoplastic polyester, or thermoplastic polyolefin. The disk substrate may be formed of aluminum or may be a substrate with nickel-phosphorus plating on the surface thereof.

The above aluminum oxide is an abrasive and plays a role in mechanically polishing an object. The aluminum oxide may be α-alumina, δ-alumina, θ-alumina, κ-alumina, or amorphous alumina. The aluminum oxide is preferably α-alumina which is obtained by calcining aluminum hydroxide, because it has high capability for mechanically polishing an object. For obtaining α-alumina, the calcining temperature is preferably from 1,000 to 1,300° C. inclusive and the calcining time is preferably from one to five hours inclusive. The α-alumina which is obtained under a calcining temperature of lower than 1,000° C. or in a calcining time of less than one hour may have less capability for mechanically polishing an object due to insufficient or non-uniform conversion of aluminum hydroxide to α-alumina. On the other hand, the α-alumina which is obtained under a calcining temperature of higher than 1,300° C. or in a calcining time of more than five hours may scratch or roughen the surface during polishing due to a large primary particle size thereof.

Average particle size of the aluminum oxide is preferably from 0.5 to 10 μm inclusive, more preferably from 0.5 to 8 μm inclusive, and most preferably from 0.7 to 6 μm inclusive. Average particle size of the aluminum oxide of less than 0.5 μm may reduce the polishing rate of a polishing composition. Average particle size of the aluminum oxide of more than 10 μm may scratch or roughen the surface during polishing.

The content of the aluminum oxide in the polishing composition is preferably from 3 to 30% inclusive, more preferably from 5 to 25% inclusive, and most preferably from 10 to 20% inclusive, by weight. An aluminum oxide content of less than 3% by weight may reduce the polishing rate of a polishing composition. An aluminum oxide content of more than 30% by weight may cause an excessive increase in viscosity of the polishing composition and may be disadvantageous in cost.

The above reaction product is produced by a reaction between a polyalkylene oxide and a raw material compound having a functional group having reactivity with a hydroxyl group. The reaction product has viscosity and appropriately increases the viscosity of a polishing composition. This improves the dispersibility of the aluminum oxide in the polishing composition and increases the amount of the aluminum oxide held by a polishing pad during polishing, thereby increasing the polishing rate of the polishing composition. The reaction product also has wettability, which lubricates the surface during polishing and suppresses drying of the polishing composition. Lubrication of the surface during polishing enhances the mechanical polishing by the aluminum oxide. Suppression of drying of the polishing composition prevents scratches by solids produced by the drying of the polishing composition.

The above polyalkylene oxide which is a reaction raw material of the reaction product may be a homopolymer or a copolymer. Each of the monomer units in the polyalkylene oxide preferably has a number of carbon atoms of three or less, such as an ethylene oxide unit or a propylene oxide unit. If each of the monomer units in the polyalkylene oxide has a number of carbon atoms of more than three, the viscosity of the polishing composition may excessively increase. A reaction product using the copolymer of ethylene oxide and propylene oxide as a reaction raw material particularly improves the polishing rate, handling properties, and antifoaming properties of the polishing composition. Therefore, the polyalkylene oxide is preferably a copolymer of ethylene oxide and propylene oxide.

The above raw material compound which is the other reaction raw material of the reaction product may be glycerin, 1,2,3-trimethoxy propane, ethylene glycol, 1,2-diethoxy ethane, diethyl ether, or methyl acetate. A reaction product using glycerin as a reaction raw material particularly improves the polishing rate, handling properties, and antifoaming properties of the polishing composition. Therefore, the raw material compound is preferably glycerin.

The reaction for producing the reaction product is a dehydration reaction when glycerin is used as a raw material compound and a demethanolation reaction when methyl acetate is used as a raw material compound.

The reaction product may be a polyoxyalkylene glycol. The polyoxyalkylene glycol may be of a triol-type or of a diol-type. The polyoxyalkylene glycol of a triol-type includes poly(oxyethylene-oxypropylene)glyceryl ether, and is suitable for the reaction product because it particularly improves the polishing rate, handling properties, and antifoaming properties of the polishing composition. The polishing composition may include two or more reaction products.

The number average molecular weight of the reaction product is preferably from 500 to 10,000 inclusive, more preferably from 1,000 to 5,000 inclusive, and the kinematic viscosity at 25° C. of the reaction product is preferably from 50 to 5,000 mm$^2$/s inclusive, more preferably from 100 to 1,000 mm$^2$/s inclusive. If the number average molecular weight or kinematic viscosity of the reaction product is too small, the polishing rate of the polishing composition may be reduced. If the number average molecular weight or kinematic viscosity of the reaction product is too large, the viscosity of the polishing composition may excessively increase.

The content of the reaction product in the polishing composition is preferably from 1 to 30% inclusive, more preferably from 3 to 20% inclusive, and most preferably from 5 to 15% inclusive, by weight. If the content of the reaction product is less than 1% by weight, the polishing rate of the polishing composition may be reduced. If the content of the reaction product is more than 30% by weight, the viscosity of the polishing composition may excessively increase.

The above polishing accelerator plays a role in chemically polishing an object. The polishing accelerator includes at least one salt selected from the group consisting of a metal salt of an inorganic acid or organic acid and an ammonium salt of an inorganic acid or organic acid. The inorganic acid may be nitric acid, sulfuric acid, or hydrochloric acid. The organic acid may be oxalic acid, lactic acid, acetic acid, formic acid, citric acid, tartaric acid, malic acid, gluconic acid, glycolic acid, or malonic acid. The metal salt may be an aluminum salt, nickel salt, lithium salt, magnesium salt, sodium salt, or potassium salt. The polishing accelerator preferably includes an aluminum salt, nickel salt, or lithium salt of either an inorganic acid or organic acid, more preferably includes an aluminum salt of nitric acid, oxalic acid, or lactic acid, because it has a high capability for chemically polishing an object.

The content of the polishing accelerator in the polishing composition is preferably from 0.5 to 20% inclusive, more preferably from 1 to 15% inclusive, most preferably from 3 to 8% inclusive, by weight. If the content of the polishing accelerator is less than 0.5% by weight, the polishing rate of the polishing composition may be reduced. If the content of the polishing accelerator is more than 20% by weight, roughening of the hands of an operator and corrosion of the polishing machine may occur and it is also uneconomical.

The above water serves as a medium to disperse or dissolve components other than water in the polishing composition. The water may be the filtered industrial water, city water, or distilled water, and preferably contains as little impurities as possible.

The pH of the polishing composition is preferably from 2 to 7 inclusive, more preferably from 2 to 5 inclusive. If the pH of the polishing composition is lower than 2, corrosion of the polishing machine and roughening of the hands of an operator may occur. If the pH is higher than 7, the polishing rate of the polishing composition may be reduced.

The polishing composition is prepared by mixing aluminum oxide, a reaction product, a polishing accelerator, and water. For the mixing, the order in which each component is added may be in any order, or all the components may be added at the same time. In addition, a blade-type agitator or an ultrasonic dispersing machine may be used for the mixing.

When an object is polished using a polishing composition, at least one of a polishing pad and the object is slid relative to the other while supplying the polishing composition to the polishing pad in a state where the polishing pad is pressed on the object. The temperature of the polishing composition to be supplied during polishing is preferably from 0 to 35° C. inclusive, more preferably from 10 to 20° C. inclusive. If this temperature is lower than 0° C., the polishing composition may freeze. If this temperature is higher than 35° C., the polishing rate and the stability of the polishing composition may be reduced.

The present embodiment provides the following advantages.

Since the polishing composition according to the present embodiment contains a reaction product which contributes to the improvement of the polishing rate of the polishing composition, it has a higher polishing rate than conventional polishing compositions. As described above, the improvement of the polishing rate of the polishing composition by using the reaction product is primarily caused by viscosity and lubricity, which the reaction product includes. The reaction product also reduces the thixotropy and dilatancy of the polishing composition, thereby retaining aluminum oxide in the polishing composition on a polishing pad with uniformity and stability during polishing. This also is a cause of the improvement in the polishing rate.

In a polishing composition according to the present embodiment, the improvement of the polishing rate is achieved not by an increase in the amount of an abrasive or a polishing accelerator, but by the addition of a reaction product. Consequently, the polishing composition has a high polishing rate without the disadvantage of an increase in the amount of the abrasive such as cost increase and an excessive increase in viscosity, and without the disadvantage of an increase in the amount of the polishing accelerator such as roughening of the hands of an operator and corrosion of a polishing machine.

It should be apparent to those skilled in the art that the present invention may be embodied in many other specific forms without departing from the spirit of scope of the invention. Particularly, it should be understood that the invention may be embodied in the following forms.

The polishing composition may further contain glycol represented by general formula 1:H—(OCH$_2$CH$_2$)$_n$—OH or general formula 2:H—(OCH(CH$_3$)CH$_2$)$_m$—OH, wherein n is an integer of 1 to 230 inclusive and m is an integer of 1 to 180 inclusive. The glycol has lower viscosity than the reaction product, and contributes to the improvement of the polishing rate of the polishing composition by the viscosity in the same manner as the reaction product. The glycol also has wettability, and contributes to the improvement of the polishing rate of the polishing composition also by the wettability in the same manner as the reaction product. Further, the wettability of the glycol suppresses drying of the polishing composition similar to the wettability of the reaction product. The glycol represented by general formula 1 is polyethylene glycol including ethylene glycol when n is 1, diethylene glycol when n is 2, and triethylene glycol when n is 3. Ethylene glycol is preferred as it is less expensive and largely contributes to the improvement of the polishing rate. The glycol represented by general formula 2 is polypropylene glycol including propylene glycol when m is 1, dipropylene glycol when m is 2, and tripropylene glycol when m is 3. Propylene glycol is preferred as it is less expensive and largely contributes to the improvement in the polishing rate. When n is larger than 230 in general formula 1, or m is larger than 180 in general formula 2, the viscosity of the polishing composition may increase excessively. The content of the glycol in the polishing composition is preferably from 1 to 30% inclusive, more preferably from 3 to 20% inclusive, and most preferably from 5 to 15% inclusive, by weight. If the content of the glycol is less than 1% by weight, the polishing rate of the polishing composition shows only a small improvement. If the content of the glycol exceeds 30% by weight, the viscosity of the polishing composition may excessively increase.

The polishing composition may further contain at least one metal oxide selected from colloidal silica, colloidal alumina, colloidal zirconia, colloidal titania, fumed silica, fumed alumina, fumed zirconia, and fumed titania. The metal oxide is dispersed in a colloidal state in the polishing composition, increasing the viscosity of the polishing composition. This improves the dispersibility of aluminum oxide in the polishing composition and suppresses the caking of aluminum oxide. The metal oxide further suppresses the coagulation of aluminum oxide in the polishing composition, thereby suppressing the formation of scratches caused by coagulated aluminum oxide. Colloidal silica or colloidal alumina has an especially high effect on suppressing the occurrence of caking of aluminum oxide. The colloidal silica may be coated with alumina, zirconia, titania, or ceria. When the polishing composition containing the metal oxide is prepared, the metal oxide is preferably added last in order to prevent the gelation of the polishing composition. The content of the metal oxide in the polishing composition is preferably from 0.05 to 5% inclusive, more preferably from 0.1 to 3% inclusive, most preferably from 0.5 to 2% inclusive, by weight. If the content of the metal oxide is less than 0.05% by weight, the occurrence of caking is not suppressed much. If the content of the metal oxide exceeds 5% by weight, the viscosity of the polishing composition may excessively increase.

The polishing composition may further contain an antifoaming agent. The antifoaming agent suppresses the formation of bubbles in the polishing composition, thereby stabilizing the supply of the polishing composition to a polishing machine. The content of the antifoaming agent in the polishing composition is preferably from 0.05 to 15% by weight inclusive. If the content of the antifoaming agent is less than 0.05% by weight, the formation of bubbles is not suppressed much. An antifoaming agent content exceeding 15% by weight is uneconomical.

The polishing composition may further contain cellulose. Similar to the above metal oxide, the cellulose suppresses the occurrence of the caking of aluminum oxide and the formation of scratches caused by coagulated aluminum oxide. The cellulose also improves the wettability of the surface during polishing, thereby suppressing the adherence of aluminum oxide in the polishing composition or foreign matter on the surface during polishing. The cellulose may be hydroxyethylcellulose, carboxymethylcellulose, or microcrystalline cellulose. Hydroxyethylcellulose and microcrystalline cellulose have an especially high effect on suppressing the occurrence of caking of aluminum oxide. The polishing composition may contain two or more types of celluloses. The content of the cellulose in the polishing composition is preferably from 0.001 to 2% inclusive, more preferably from 0.01 to 1% inclusive, by weight. If the content of the cellulose is less than 0.001% by weight, the occurrence of caking is not suppressed much. If the content of the cellulose exceeds 2% by weight, the viscosity of the polishing composition may excessively increase.

The polishing composition may further contain anti-settling agents such as aluminum ammonium sulfate, grinding fluid, rust-inhibitors, preservatives, antibacterial agents, or surfactants.

The polishing composition may be prepared by diluting a stock solution with water immediately before use.

The polishing composition may be used for polishing objects other than synthetic resin products and metal products. The objects other than synthetic resin products and metal products include a glass substrate for a recording medium such as a magnetic disk and magneto-optical disk.

The present invention will now be further described by referring to Examples and Comparative Examples.

In Examples 1 to 14, polishing compositions were prepared by mixing aluminum oxide, a reaction product, a polishing accelerator, and water, and other components as necessary. In Comparative Examples 1 to 10, polishing compositions were prepared by mixing aluminum oxide, a polishing accelerator, and water, and other components as necessary. The average particle size of aluminum oxide in Examples 1 to 14 and Comparative Examples 1 to 10 is 1.3 µm. This average particle size is the value measured by Coulter Multisizer II made by Beckman Coulter, Inc. The detailed composition of each polishing composition is shown in Table 1. Note that all the polishing compositions in Examples 1 to 14 and Comparative Examples 1 to 10 contain 0.5% by weight of a silicone antifoaming agent "TSA-772" made by Toshiba Silicone Co., Ltd. along with the components shown in Table 1.

TABLE 1

| | | | | | | |
|---|---|---|---|---|---|---|
| Ex. 1 | alumina 10 wt % | GEP-2800 5 wt % | aluminum nitrate 2 wt % | — | — | — |
| Ex. 2 | alumina 10 wt % | GEP-2800 5 wt % | aluminum nitrate 2 wt % | PG 15 wt % | — | — |
| Ex. 3 | alumina 10 wt % | GEP-2800 10 wt % | aluminum nitrate 2 wt % | — | — | — |
| Ex. 4 | alumina 10 wt % | GEP-2800 10 wt % | aluminum nitrate 2 wt % | PG 5 wt % | — | — |
| Ex. 5 | alumina 10 wt % | GEP-2800 10 wt % | aluminum nitrate 2 wt % | — | col. alumina 1 wt % | — |
| Ex. 6 | alumina 10 wt % | GEP-2800 10 wt % | aluminum nitrate 2 wt % | — | col. alumina 1 wt % | HEC 1 wt % |
| Ex. 7 | alumina 10 wt % | GEP-2800 10 wt % | aluminum nitrate 2 wt % | — | col. silica 1 wt % | — |
| Ex. 8 | alumina 10 wt % | GEP-2800 10 wt % | aluminum lactate 2 wt % | — | — | — |
| Ex. 9 | alumina 10 wt % | GEP-2800 10 wt % | aluminum oxalate 2 wt % | — | — | — |
| Ex. 10 | alumina 10 wt % | GEP-2800 10 wt % | nickel sulfate 2 wt % | — | — | — |
| Ex. 11 | alumina 10 wt % | GEP-2800 20 wt % | aluminum nitrate 2 wt % | — | — | — |
| Ex. 12 | alumina 10 wt % | GH-200 5 wt % | aluminum nitrate 2 wt % | — | — | — |
| Ex. 13 | alumina 10 wt % | GH-200 5 wt % | aluminum nitrate 2 wt % | PG 15 wt % | — | — |
| Ex. 14 | alumina 10 wt % | GH-200 10 wt % | aluminum nitrate 2 wt % | — | — | — |
| C. Ex. 1 | alumina 10 wt % | — | aluminum nitrate 2 wt % | PG 10 wt % | — | — |
| C. Ex. 2 | alumina 10 wt % | — | aluminum nitrate 2 wt % | PG 20 wt % | — | — |
| C. Ex. 3 | alumina 10 wt % | — | aluminum nitrate 5 wt % | PG 10 wt % | — | — |
| C. Ex. 4 | alumina 16 wt % | — | aluminum nitrate 2 wt % | PG 10 wt % | — | — |
| C. Ex. 5 | alumina 20 wt % | — | aluminum nitrate 2 wt % | PG 10 wt % | — | — |
| C. EX. 6 | alumina 10 wt % | — | aluminum nitrate 2 wt % | PG 10 wt % EG 10 wt % | — | — |
| C. Ex. 7 | alumina 10 wt % | — | aluminum lactate 2 wt % | PG 10 wt % | — | — |
| C. Ex. 8 | alumina 10 wt % | — | aluminum oxalate 2 wt % | PG 10 wt % | — | — |
| C. Ex. 9 | alumina 10 wt % | — | nickel sulfate 2 wt % | PG 10 wt % | — | — |
| C. Ex. 10 | alumina 10 wt % | — | aluminum nitrate 2 wt % | EG 10 wt % | — | — |

In Table 1, GEP-2800 denotes a trade name "NEWPOL GEP-2800" that is poly(oxyethylene-oxypropylene)glyceryl ether made by Sanyo Chemical Industries, Ltd., and GH-200 denotes a trade name "ADEKA CARPOL GH-200" that is polyoxyalkylene glycol of a triol-type made by Asahi Denka Co., Ltd. Also, PG denotes propylene glycol, EG denotes ethylene glycol, and HEC denotes hydroxyethylcellulose.

Using each of the polishing compositions in Examples 1 to 14 and Comparative Examples 1 to 10, polishing was practiced under the following polishing conditions.

Polishing Conditions:

Polishing machine: Coburn 505-type aspherical lens polishing machine,

Object to be polished: plastic lens with a diameter of 70 mm composed of diethylene glycol bis(allyl carbonate) (CR-39), Polishing pad: 3" Coburn white, flocked fabric-type polishing pad, Polishing load: 2.35 Pa (=240 g/cm$^2$), Polishing time: 5 minutes, Temperature of polishing composition: 13° C.±1° C., and Supply rate of polishing composition: 2 liters/minute (circulated).

After polishing under the above conditions, the difference between the weight of the plastic lens before and after polishing, that is, the weight reduction of the plastic lens by polishing was determined. Each value shown in the column entitled "Stock Removal Rate" in Table 2 denotes the average value of the weight reduction determined for each of the five samples.

A non-contact ultra-precision surface profilometer "TOPO 3D" made by WYKO Co. was used to measure the surface roughness Ra of the plastic lenses after polishing, by objective lenses of 40×. The results are shown in the column entitled "Surface Roughness" in Table 2.

After 50 pieces of plastic lens were polished, visual observations were made to determine whether solids in the polishing composition were deposited on the inner wall of the polishing machine or not. The evaluation results of the adherence of the polishing composition are shown in the column entitled "Adherence" in Table 2 by classifying them by three different scales, that is, no adherence (○), little adherence (Δ) and much adherence (X).

The specific gravity of the polishing composition which was recovered after polishing fifty plastic lenses was divided by the specific gravity of the polishing composition before use, and the resultant value was multiplied by 100 to obtain the rate of reduction of specific gravity. The evaluation results of the stability of specific gravity are shown in the column entitled "Stability of Specific Gravity" in Table 2 by classifying them by three different scales, that is, a rate of reduction of specific gravity of less than 3% (○), a rate of reduction of specific gravity of 3% to less than 10% (Δ) and a rate of reduction of specific gravity of 10% or more (X).

The preparation cost for each polishing composition, based on the preparation cost of the polishing composition in Comparative Example 4 being 100, is shown in the column entitled "Cost" in Table 2.

TABLE 2

|  | Stock Removal Rate (g/5 minutes) | Surface Roughness (nm) | Adherence | Stability of Specific Gravity | Cost |
|---|---|---|---|---|---|
| Ex. 1 | 0.102 | 3.5 | ○ | ○ | 66 |
| Ex. 2 | 0.116 | 3.2 | ○ | ○ | 76 |
| Ex. 3 | 0.115 | 3.4 | ○ | ○ | 69 |
| Ex. 4 | 0.117 | 3.3 | ○ | ○ | 72 |
| Ex. 5 | 0.114 | 3.2 | ○ | ○ | 73 |
| Ex. 6 | 0.113 | 3.0 | ○ | ○ | 74 |
| Ex. 7 | 0.114 | 3.1 | ○ | ○ | 73 |
| Ex. 8 | 0.114 | 3.1 | ○ | ○ | 69 |
| Ex. 9 | 0.113 | 3.1 | ○ | ○ | 69 |
| Ex. 10 | 0.080 | 4.3 | Δ | Δ | 72 |
| Ex. 11 | 0.128 | 3.3 | Δ | Δ | 75 |
| Ex. 12 | 0.101 | 3.5 | ○ | ○ | 66 |
| Ex. 13 | 0.114 | 3.2 | ○ | ○ | 72 |
| Ex. 14 | 0.113 | 3.4 | ○ | ○ | 69 |
| C. Ex. 1 | 0.080 | 3.6 | ○ | ○ | 68 |
| C. Ex. 2 | 0.090 | 3.4 | ○ | ○ | 75 |
| C. Ex. 3 | 0.097 | 3.7 | ○ | ○ | 70 |
| C. Ex. 4 | 0.103 | 3.8 | ○ | ○ | 100 |
| C. Ex. 5 | 0.112 | 3.7 | Δ | Δ | 113 |
| C. Ex. 6 | 0.089 | 3.4 | ○ | ○ | 75 |
| C. Ex. 7 | 0.080 | 3.7 | ○ | ○ | 68 |
| C. Ex. 8 | 0.078 | 3.8 | ○ | ○ | 68 |
| C. Ex. 9 | 0.055 | 4.5 | Δ | Δ | 71 |
| C. Ex. 10 | 0.078 | 3.6 | ○ | ○ | 68 |

As shown in Table 2, all of the values for stock removal rate, surface roughness, and cost are generally good in Examples 1 to 14 compared with those in Comparative Examples 1 to 10. In addition, the formation of scratches as problems was not observed in the plastic lenses which were polished using the polishing compositions in Examples 1 to 14.

The invention claimed is:

1. A polishing composition comprising:
   a reaction product produced by a condensation reaction with elimination of a simple molecule between a polyalkylene oxide and a compound selected from the group consisting of glycerin, 1,2,3-trimethoxy propane, ethylene glycol, 1,2-diethoxy ethane, and methyl acetate;
   aluminum oxide;
   a polishing accelerator including at least one salt selected from the group consisting of a metal salt of an inorganic acid or organic acid and an ammonium salt of an inorganic acid or organic acid; and
   water.

2. The polishing composition according to claim 1, wherein the polyalkylene oxide is a copolymer of ethylene oxide and propylene oxide.

3. A polishing composition comprising:
   a reaction product produced by a condensation reaction with elimination of water between a polyalkylene oxide and glycerin;
   aluminum oxide;
   a polishing accelerator including at least one salt selected from the group consisting of a metal salt of an inorganic acid or organic acid and an ammonium salt of an inorganic add or organic acid; and
   water.

4. The polishing composition according to claim 1, wherein the number average molecular weight of the reaction product is from 500 to 10,000 inclusive, and the kinematic viscosity at 25° C. of the reaction product is from 50 to 5,000 mm²/s inclusive.

5. The polishing composition according to claim 1, wherein the content of the reaction product in the polishing composition is from 1 to 30% by weight inclusive.

6. The polishing composition according to claim 1, wherein the aluminum oxide is α-alumina.

7. The polishing composition according to claim 1, wherein the polishing accelerator includes aluminum salt of nitric acid, oxalic acid, or lactic acid.

8. The polishing composition according to claim 1, further comprising glycol represented by general formulae H—(OCH$_2$CH$_2$)$_n$—OH or H—(OCH(CH$_3$)CH$_2$)$_m$—OH, wherein n is an integer of 1 to 230 inclusive and m is an integer of 1 to 180 inclusive.

9. The polishing composition according to claim 8, wherein the glycol is ethylene glycol or propylene glycol, or both.

10. The polishing composition according to claim 1, further comprising at least one metal oxide selected from colloidal silica, colloidal alumina, colloidal zirconia, colloidal titania, fumed silica, fumed alumina, fumed zirconia, and fumed titania.

11. The polishing composition according to claim 10, wherein the metal oxide is colloidal silica or colloidal alumina, or both.

12. The polishing composition according to claim 1, further comprising an antifoaming agent.

13. The polishing composition according to claim 1, further comprising cellulose.

14. The polishing composition according to claim 13, wherein the cellulose is hydroxyethylcellulose or microcrystalline cellulose, or both.

15. The polishing composition according to claim 1, wherein the pH of the polishing composition is from 2 to 7 inclusive.

16. A method for polishing an object, the method comprising:
   preparing a polishing composition, wherein the polishing composition includes:
      a reaction product produced by a condensation reaction with elimination of a simple molecule between a polyalkylene oxide and a compound selected from the group consisting of glycerin, 1,2,3-trimethoxy propane, ethylene glycol, 1,2-diethoxy ethane, and methyl acetate;
      aluminum oxide;
      a polishing accelerator including at least one salt selected from the group consisting of a metal salt of an inorganic acid or organic acid and an ammonium salt of an inorganic acid or organic acid; and
      water; and polishing the surface of the object by using the polishing composition.

17. The method according to claim 16, wherein the object to be polished is a synthetic resin product or a metal product.

18. The method according to claim 16, wherein the object to be polished is a synthetic resin product.

19. The polishing composition according to claim 1, wherein the reaction product is poly(oxyethylene-oxypropylene)glyceryl ether.

20. A synthetic resin polishing composition comprising:
poly(oxyethylene-oxypropylene)glyceryl ether;
α-alumina;
a polishing accelerator including at least one salt selected from the group consisting of an aluminum salt of nitric acid, oxalic acid, and lactic acid;
glycol represented by general formulae $H-(OCH_2CH_2)_n-OH$ or $H-(OCH(CH_3)CH_2)_m-OH$, wherein n is an integer of 1 to 230 inclusive and m is an integer of 1 to 180 inclusive; and
water.

* * * * *